US007075291B2

(12) United States Patent
Tomioka

(10) Patent No.: US 7,075,291 B2
(45) Date of Patent: Jul. 11, 2006

(54) TONE WHEEL TESTING APPARATUS AND ITS TEST METHOD

(75) Inventor: Masanori Tomioka, Okayama (JP)

(73) Assignee: Uchiyama Manufacturing Corp., Okayama (JP)

( * ) Notice: Subject to any disclaimer, the term of this patent is extended or adjusted under 35 U.S.C. 154(b) by 136 days.

(21) Appl. No.: 10/781,720

(22) Filed: Feb. 20, 2004

(65) Prior Publication Data

US 2005/0012643 A1    Jan. 20, 2005

(30) Foreign Application Priority Data

Feb. 21, 2003    (JP)    ............................. 2003-044036

(51) Int. Cl.
*G01P 3/48* (2006.01)
(52) U.S. Cl. ................... 324/174; 324/207.25
(58) Field of Classification Search ................ 324/174, 324/207.25
See application file for complete search history.

(56) References Cited

U.S. PATENT DOCUMENTS 6,003,375 A * 12/1999 Ouchi et al. ............. 73/514.39
6,217,220 B1 * 4/2001 Ohkuma et al. ............ 384/489
6,414,479 B1 * 7/2002 LaCroix et al. ............. 324/173
6,559,633 B1 * 5/2003 Nachtigal et al. ........... 324/174

\* cited by examiner

*Primary Examiner*—Michael Tokar
*Assistant Examiner*—Tyrone Jackson
(74) *Attorney, Agent, or Firm*—Bacon & Thomas

(57) ABSTRACT

Tone wheel testing apparatus and the test method using the apparatus are disclosed. Tone wheel testing apparatus comprising a surface adjusting means for holding in the horizontal position an annular object to be tested to which a tone wheel is attached, the means comprising a pair of pressing members between which the object is held, and the one of the pressing members having a reference surface with which the tone wheel is contacted in order to make the tone wheel align in the rotary axis direction of the object, a rotatable chucking means for seizing the object so as to make the center of the object align with its rotary center when the object is held by the surface adjusting means, and a magnetic testing sensor disposed adjacent to the tone wheel of the object so as to face each other. According to which, the up and down appear on the tone wheel surface in the circumferential direction are corrected and the gap between the testing sensor and the tone wheel is accurately maintained, thereby enabling an appropriate setting arrangement of tone wheel for accurate measurement of the array pitch of each pole and the magnetic force.

8 Claims, 9 Drawing Sheets

TONE WHEEL TESTING APPARATUS AND ITS TEST METHOD

FIELD OF THE INVENTION

The present invention relates to a tone wheel testing apparatus and its test method, specifically to a tone wheel testing apparatus and its test method for measuring and testing the pitch of a magnetic pole array and the intensity of magnetic fields from the magnetic pole array of the tone wheel which is incorporated into a bearing for rotatably supporting the wheel in the suspension system of a vehicle, and which detects the rotation speed of the wheel.

PRIOR ART

A bearing provided with a tone wheel for rotatably supporting the wheel is incorporated into the suspension system of a vehicle. The bearing and a sensor attached onto a fixed member of the suspension constitute en encoder to detect the rotational speed of the wheel to control the Anti Lock Brake System (ABS) or the Traction Control System (TCS). The tone wheel is integrally provided for a rotary member at the seal for blocking off the end of the bearing, and such an example is disclosed in JP-A-9-274051.

An encoder for detecting vehicle speed is generally comprised of a tone wheel provided for a wheel (a rotary member) and a sensor provided for a fixed member (a non-rotary member) near the tone wheel so as to face each other. The tone wheel is a magnetized ring fixed to the core member of the seal ring for the bearing, which forms an array alternately magnetized with plural north or south poles. The pitch and the intensity of the magnetic field of each pole should be within a normal range anywhere in the tone wheel in order to accurately detect the rotational speed of the encoder. For this purpose, the pitch and the intensity of the magnetic field of each pole of the tone wheel attached onto the sel ring, the sectional shape of which is like the letter "L", are measured to test whether they are within the predetermined range.

Therefore, a test apparatus for measuring and testing the pitch and the intensity of the magnetic field of each pole of the tone wheel by detecting the magnetic force while rotating the seal ring having the tone wheel is desirable for removing inferior goods in advance. As an example for detecting the specification of the object to be measured while being rotated is a rotary driving apparatus disclosed in JP-A-11-215791.

However, according to such a prior test apparatus, it is not useful that the measurement isn't executed in such a manner that the space (gap) between the tone wheel and the sensor is accurately set at a regular value in order to correctly test the magnetic force of the tone wheel and the pitch of each north or south pole. Namely, if there are ups and downs on the tone wheel in the circumferential direction, the space between the tone wheel and the sensor is changed during the rotation and the changing of the magnetic force should cause interruption of the accurate magnetic detection. Therefore, it is inevitable to drive and rotate the tone wheel in accurate setting conditions such that the tone wheel has an even flat surface and the space with the sensor is within the predetermined range of dimensional difference.

Although the tone wheel is generally reinforced with a core member of the seal ring, the core member is a thin steel plate which has the section like the letter "L" doesn't have enough rigidity. Therefore, it is difficult to accurately set up the ups and downs of the tone wheel in the circumferential direction or the appropriate gap for the sensor accompanied with rotation only by simply holding the seal ring. It is predicted preliminary arrangements for accurately measuring the array pitch of both poles and the intensity of magnetic field aren't executed so that the countermeasure is required.

SUMMARY OF THE INVENTION

Considering the above-mentioned problems, the object of the present invention is to provide a tone wheel testing apparatus and the test method in which measurement of the magnetic force can be carried out under such conditions that the tone wheel surface doesn't have ups and downs and distortion in the circumferential direction and an appropriate gap between the tone wheel and the sensor is kept at any position in the circumferential direction.

According to the present invention the above-mentioned object is achieved, by the rotational speed of the tone wheel per unit time being measured by a magnetic testing sensor fixed with a predetermined gap apart from the tone wheel while rotating an annular object to be tested with the tone wheel made of a ring-like magnetic material around the rotary axis, thereby determining the quality of the tone wheel.

The annular object to be tested is kept in an appropriate attachment condition for a standard rotary axis when being held between a pair of presser members so as to be aligned with a reference surface of one member of the presser members constituting a surface adjusting means. In such a condition, the tone wheel would be incorporated into a bearing.

According to a preferable embodiment of the present invention, one member of the pair of presser members constitutes a level surface with a reference surface and the other member of the pair of presser members constitutes a positioning ring which is placed on an annular frame provided for a rotatable chucking means which has plural chucking jaws. There the positioning ring is supported by a resilient member so as to allow the moving toward the reference level board and presses the annular object with the level surface.

The jaws of the rotatable chucking means are moved outward in the base body of the rotatable chucking means to seize the annular object to be tested which is set in a suitable condition.

Therefore, after the annular object to be tested is fixed in such a suitable condition, even when the level surface is removed, the annular object to be tested is kept under such a suitable condition that the magnetic testing sensor is positioned at a fixed place and the rotational base is rotated. Then, the rotation number of rotational base is measured by the magnetic testing sensor, and compared to the standard value prepared in advance, thereby determining the quality of the tone wheel considering the difference between them.

Also it is possible to compare the rotation number with the value of a measurement by a reference encoder provided for the rotational base besides the standard value prepared in advance.

DETAILED DESCRIPTION OF THE INVENTION

The embodiments of the present invention are explained referring to the attached drawings.

Figure 1:
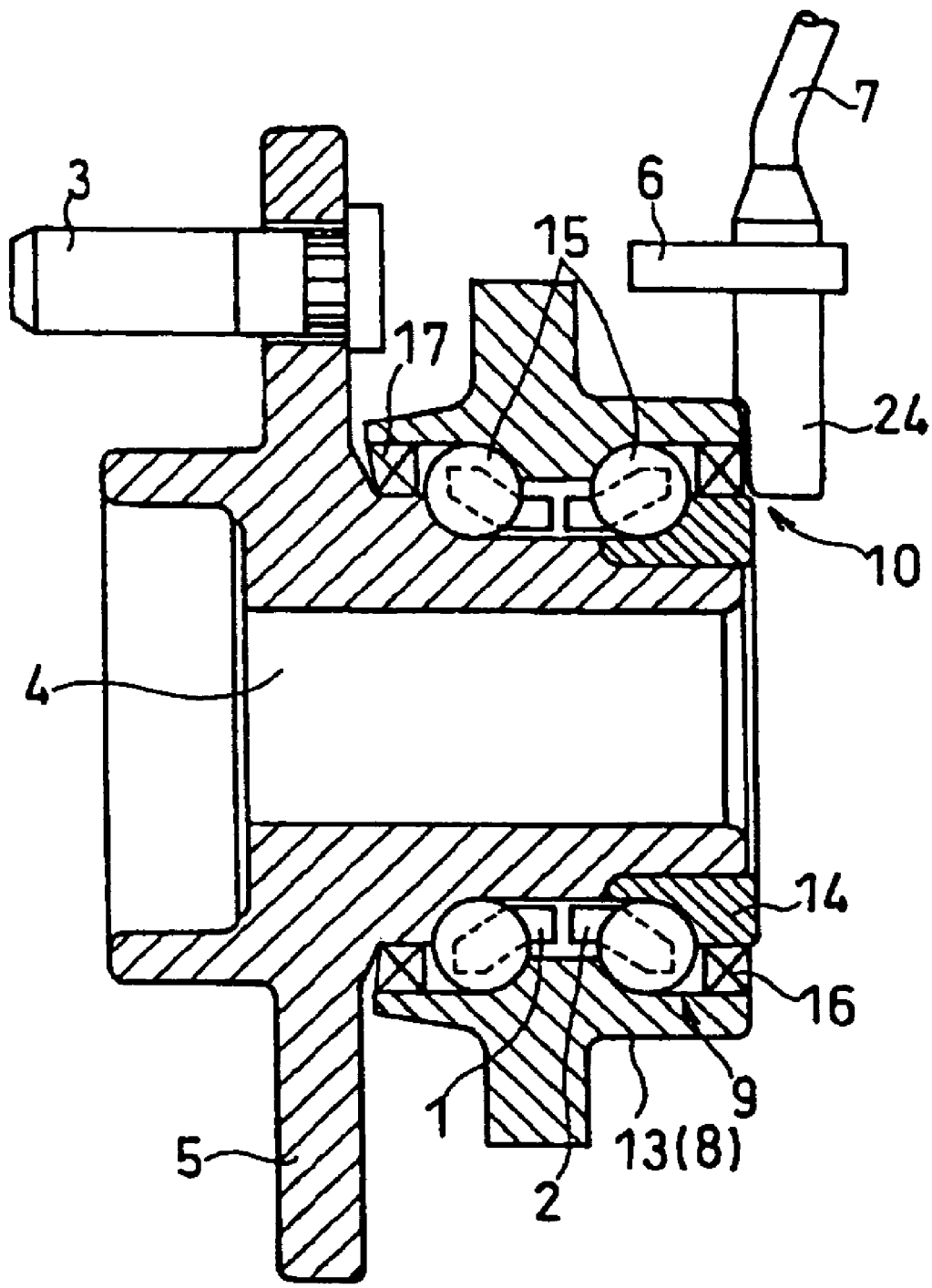
FIG. 1 is a sectional view showing the construction of a wheel bearing or thereabouts.
Figure 2:
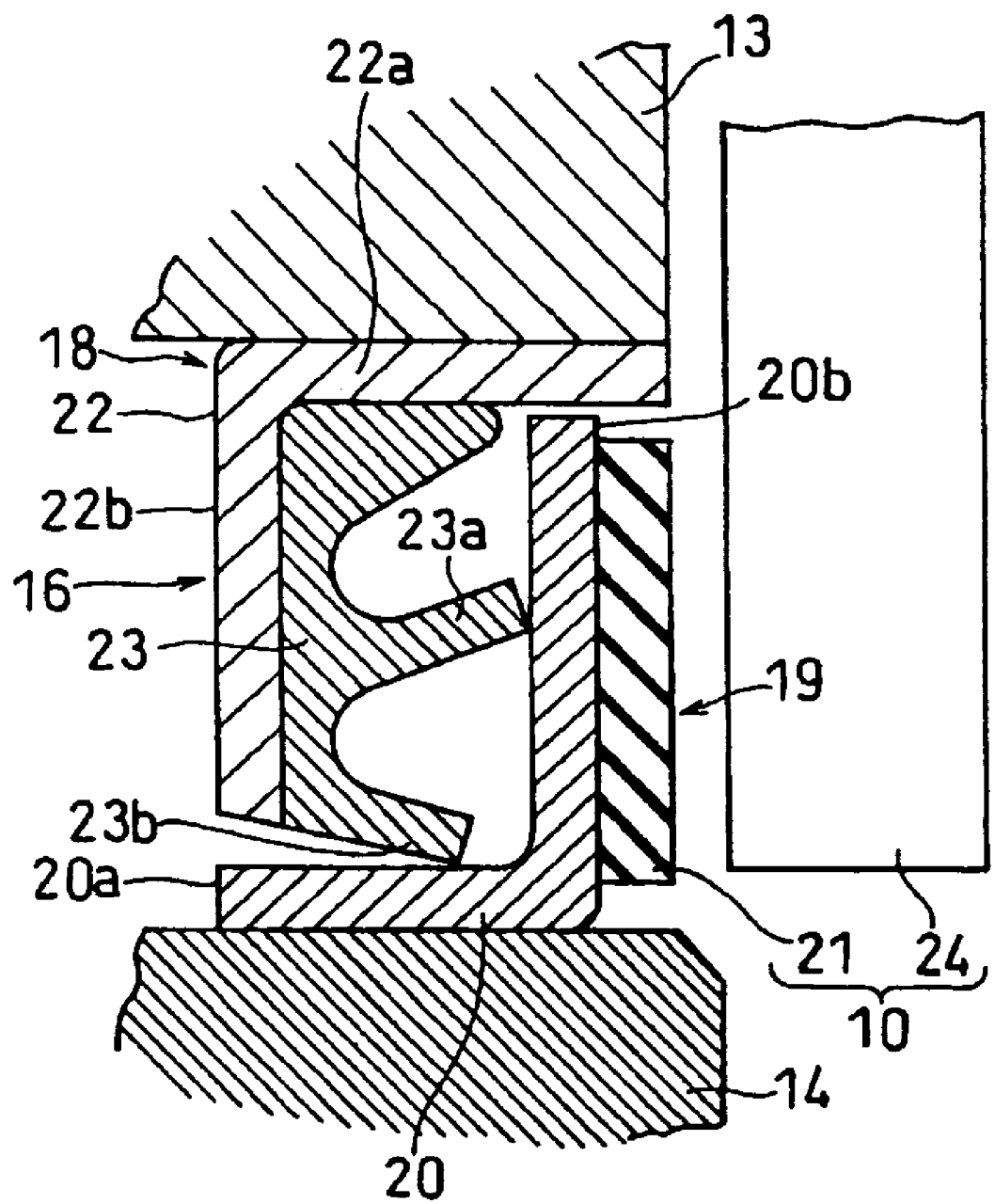
FIG. 2 is an enlarged sectional view of an inner sealing.

FIG. 1 shows the construction of an angular type bearing (rolling bearing unit) 9 rotatably supporting a driving wheel such as a wheel of automobiles or thereabouts. FIG. 2 shows an enlarged sectional view of an inner seal ring 16 incorporated into the bearing 9.

The bearing 9 is constructed so as to rotatably support a hub 5 constituting a part of the wheel which is a rotary side from a hub carrier 8 which is a non-rotary side as shown in FIG. 1. The bearing 9 comprises an outer ring 13 which is press-fitted in the hub carrier 8, an inner ring 14 integrated in the inside of the hub 5, balls 15 which are rolling elements with two rows at both sides between the hub 5, namely the inner ring 14, and retainers 1, 2 for arranging the balls 15 evenly spaced in the circumferential direction. An inner seal ring 16 is provided at the gap between the outer ring 13 and the inner ring 14 and an outer seal ring 17 is provided at the gap between the outer ring 13 and the hub 5.

The reference numeral 3 is a tap-end stud for attaching a wheel (not shown) to the hub 5 and plural studs are provided every even space in the circumferential direction. Insertion hole 4 is formed at the center of the hub 5 to insert the support axis of a driving wheel or a driven wheel. The inner seal ring 16 and the outer seal ring 17 prevent outflow of lubricant oil such as grease filled in the ball member 15, or intrusion of dust such as dirt and foreign matter from outside.

Magnetic sensor 24 fixed to the hub carrier 8 via an attachment stay 6 is disposed close to the side of the inner seal ring 16. Encoder 10 capable of detecting the rotation number of hub 5, namely of the wheel per a unit time, is comprised of this magnetic sensor 24 and a tone wheel 21 (explained later) provided for the inner seal ring 16. The reference numeral 7 indicates a lead wire connected to the magnetic sensor 24.

The inner seal ring 16 is a combination seal ring with a tone wheel, which comprises a seal ring 18 at a fixed side that is fitted in an inner end of the outer ring 13 between the inner end of the outer ring 13 and the inner end of the inner ring 14. Further it comprises a seal ring 19 at a rotary side (one example of the object to be tested) fitted onto the inner of the inner ring 14. The seal ring 19 at a rotary side is made of a magnetic metal plate such as rolled steel products or stainless steel and forms an annular slinger 20 with an L-shaped section fitted onto the end of the inner ring 14, on which the tone wheel 21 is supported.

The seal ring 18 at a fixed side is comprised of an annular core member 22 with L-shaped section and an elastic member 23. The core member 22 is formed of a fixed tubular part 22a fitted in the inner circumference of the outer ring 13 and a fixed circular-ring part 22b inwardly bent from the fixed tubular part 22a. The elastic member 23 is attached to the whole circumference of the core member 22 and has seal lips 23a, 23b at one or plural points (2 in the figure) which seal the singer 20 contacted. The elastic member 23 is generally formed with a rubber material combined with the core member 22 by baking.

The slinger 20 is formed of a rotary tubular part 20a fitted onto the outer circumference of the end of the inner ring 14 by press-fitting and a rotary circular-ring part 20b outwardly bent from the rotary tubular part 20a. The tone wheel 21 is attached with adhesion onto the side surface of the rotary circular-ring part 20b so as to face the magnetic sensor 24 (the right side in FIG. 2).

Figure 3:
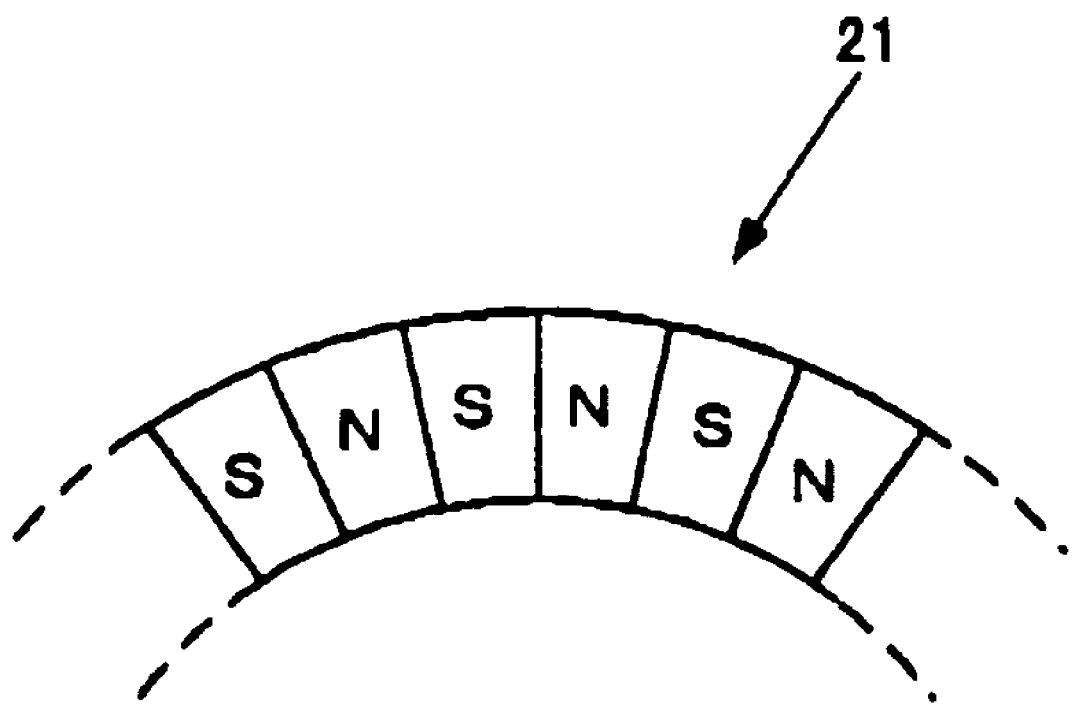
FIG. 3 is a partial side view showing how the magnetic poles are arranged for the tone wheel.

As shown in FIG. 3 the tone wheel 21 is made of a magnetic rubber magnetized in such a manner that the south pole and the north pole are alternately arranged every an equal space around its circumference. Namely, the tone wheel 21 is formed of a circular-ring magnetic rubber including magnetic powder such as ferrite mixed and its magnetizing direction is alternate every an equal space around its circumference.

As shown in FIG. 2 the magnetic sensor 24 attached to the hub carrier 8 is placed at the side of the tone wheel 21 in close vicinity. The magnetic sensor 24, the rotary side seal ring 19 and the rotary tone wheel 21 compose an encoder for detecting the rotation speed of wheel (tire 1) rotatably supported by the suspension system. For accurate detection of the rotation speed with such a composed encoder, it is required that the south pole and the north pole in the tone wheel 21 are arranged every an equal space with higher accuracy than a standard level and that the intensity of the magnetic field of each pole is stronger than a predetermined value.

Next, the tone wheel testing apparatus A for measuring the specification of the magnetism of the tone wheel and the tone wheel test method are explained hereunder. The tone wheel testing apparatus A measures the magnetic specification such as the space between the south pole and the north pole and the intensity of the magnetic field of tone wheel 21 as mentioned above.

Figure 4:
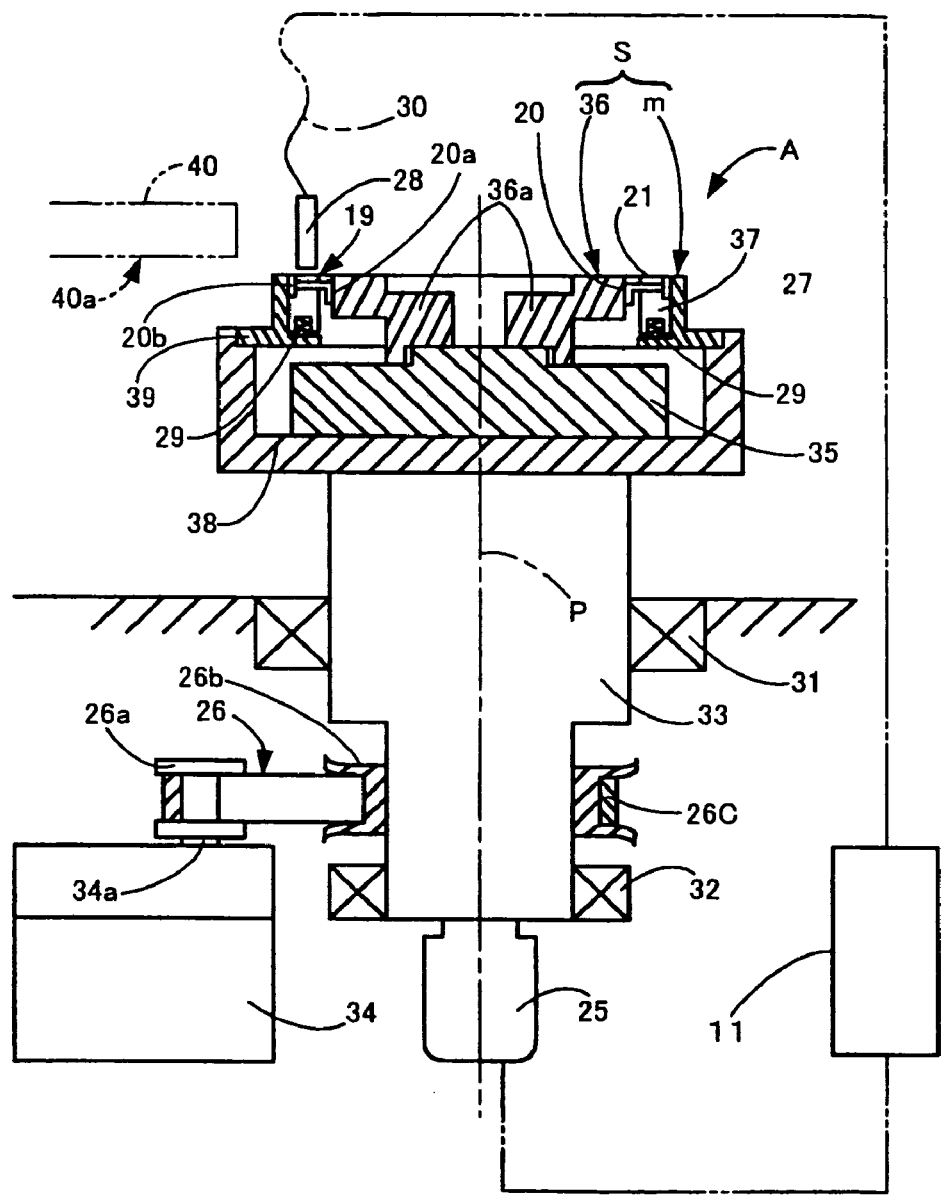
FIG. 4 is a diagram showing the principle of construction of a tone wheel testing apparatus.

As shown in FIG. 4, the tone wheel testing apparatus A comprises a vertical rotary axis 33 rotatably supported with an upper bearing 31 and a lower bearing 32, a motor 34 to rotate the rotary axis 33 via a belt transmission mechanism 26, a rotary-type standard encoder 25 for detecting the rotation number of rotary axis 33 per a unit time, a rotatable chuck means 27 attached to the upper end of the rotary axis 33 accompanying the rotation of the rotary axis, a magnetic testing sensor 28, and a control means 11. The reference numeral 30 indicates a lead wire connected to the magnetic testing sensor 28.

The belt transmission mechanism 26 is comprised of a small-diameter driving pulley 26a provided for an output axis 34a of the motor 34, a large-diameter passive pulley 26b provided for the rotary axis 33, and a mission belt 26c wound around the both pulleys 26a, 26b for the purpose of a speed reduction mechanism.

Figure 5:
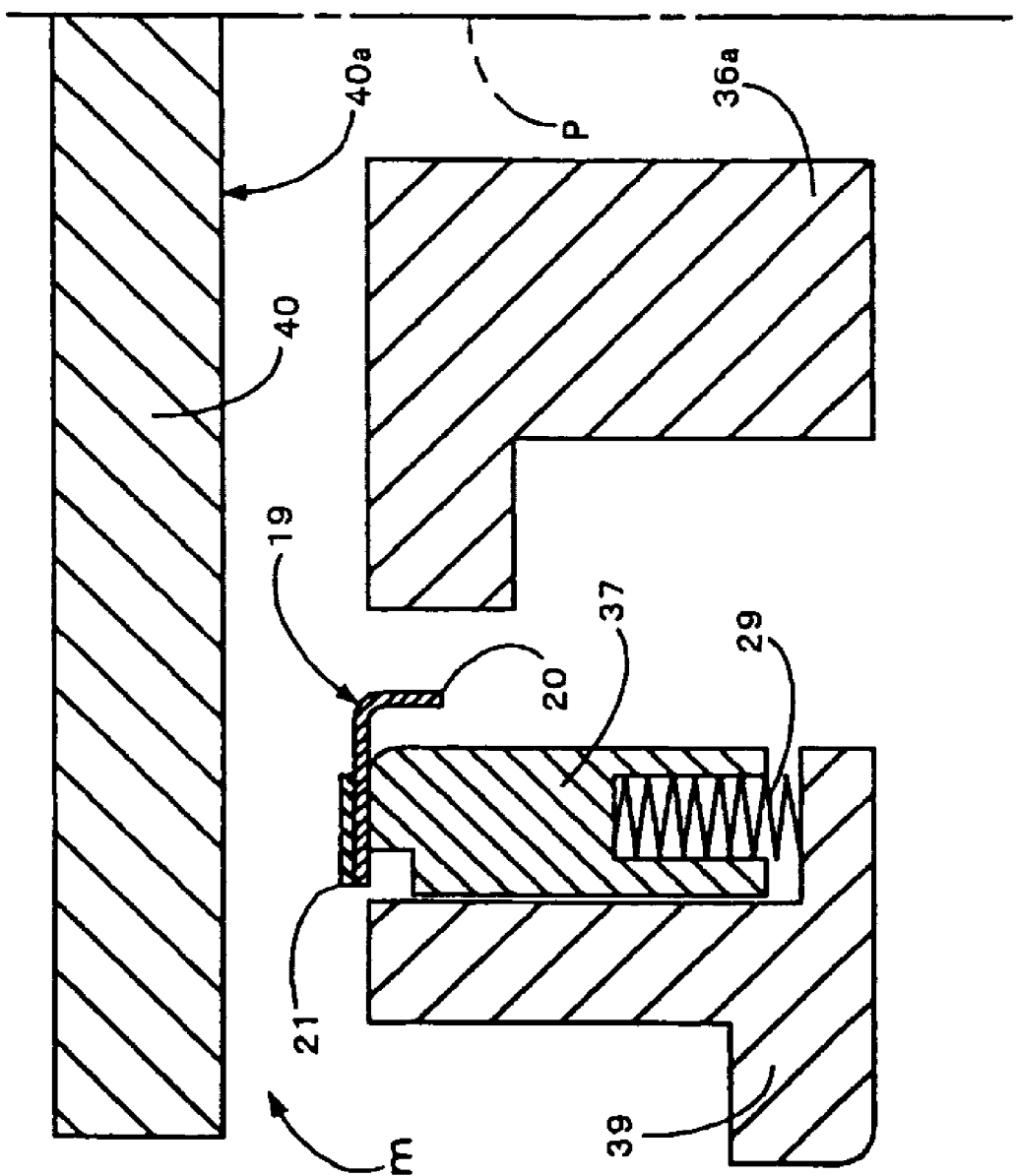
FIG. 5 is an explanatory operation view showing a tone wheel test method (No. 1).

The rotatable chucking mechanism 27 comprises a rotary receiver 38 like a basin integrally attached to the top of the rotary axis 33, an annular frame (one example of a frame) 39 fitted in the inner circumference of the upper end of the rotary receiver 38, a base body 35 which is circular shown in a plan view and is fixed on the inner bottom of the rotary receiver 38, chucking jaws 36 installed onto the base body 35, which are capable to move in and out in the base body, a positioning ring 37 (one example of the other presser member) fitted in the annular frame 39 so as to be vertically slidable, and a reference level board 40 like a thick disc (one example of one presser member, see FIG. 5).

The rotatable chucking mechanism 27 has a mechanism for move its jaws in the base body (for example, the collet chuck system or the air chuck system), not shown, wherein each one of three fan-shaped jaws 36a which are arranged every 120 degrees seen from the top is supported possibly to be moved in and out of the diameter direction in the base body 35 at a fixed side. Compression springs 29 (one example of resilient material) for energizing the positioning ring 37 upwardly against the outer frame 39 in a predetermined area are provided for the positioning ring 37 every an appropriate equal space in the circumferential direction.

The control means 11 serves as a processing means for determining the quality of the produced tone wheel. Namely, there is provided the above mentioned standard encoder 25 capable of acquiring the rotation number per a unit time of tone wheel 21 rotating while being held and fixed with the chuck 36 by detecting the rotation number of rotary receiver 38 per a unit time. Thereby it is possible to determine whether the tone wheel 21 is good item or inferior item by comparing the information acquired by the standard encoder 25 with the information detected by the magnetic testing sensor 28. Although not shown in the figure, it is advantageous that a display means is provided in such a manner that an acceptance lamp and a failure lamp are provided and the acceptance lamp is turned on to show "OK" when the test result is within the clearance and the failure lamp is turned on to show "NG" when it is out of the clearance.

Operation of the test measurement of the tone wheel 21 is determined by the detection signal of the magnetic testing sensor 28 when the rotary axis 33, namely the rotatable chucking mechanism 27, is rotated by the motor 34 while the seal ring 19 at a rotary side is supported to be positioned and fixed with the chucking jaws 36a.

In this case, if the tone wheel 21 has ups and downs or irregularities on the annular surface in the circumferential direction or there is any dispersion in the set space dimension between the tone wheel 21 and the test sensor 28, accurate detection isn't achieved. Therefore, it is a key point for a useful test whether the seal ring 19 at a rotary side is attached and fixed to the rotatable chucking mechanism 27 while keeping its flat condition and without being deformed.

Figure 6:
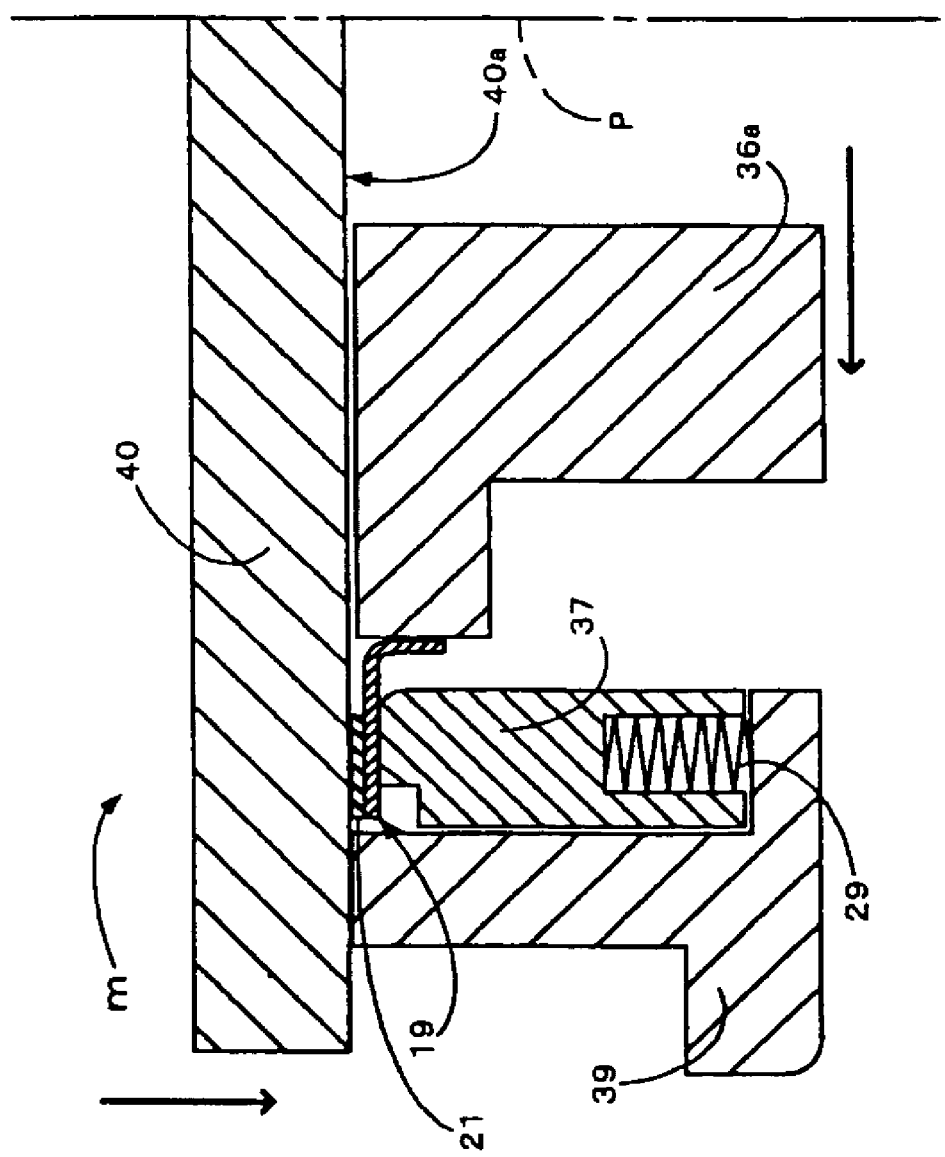
FIG. 6 is an explanatory operation view showing a tone wheel test method (No. 2).
Figure 7:
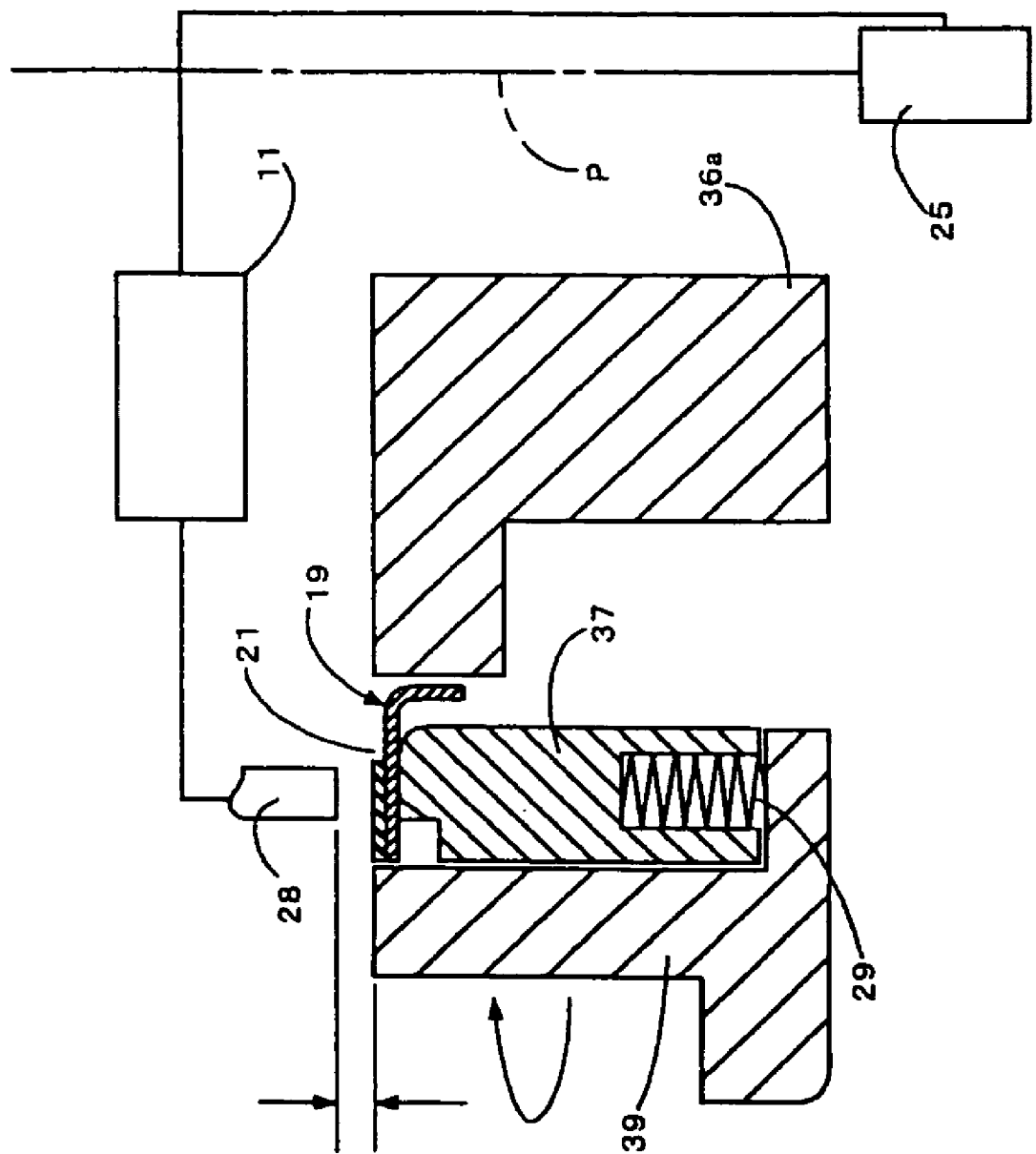
FIG. 7 is an explanatory operation view showing a tone wheel test method (No. 3).

Next, the tone wheel test method when the seal ring 19 at a rotary side is attached to the chuck mechanism 27 is explained. For easy understanding, FIG. 5–FIG. 7 show one side of the rotary center P of the rotary axis 33. The reference level board 40 is capable of switching into an operation position above the annular frame 39 and a non-operation position horizontally apart from the ratatable chucking mechanism 27 and is vertically movable so as to be far from and near the annular frame 39. The bottom 40a of the reference level board 40 is formed as a high precision flat reference surface by fine finishing.

As shown in FIG. 5, the seal ring 19 at a rotary side is toppled sideways in such a manner that a rotary circular-ring part 20b is directly placed on the positioning ring 37 internally fitted in the annular frame 39, then the reference level board 40 which is at the non-operation position is moved to the operation position. The reference level board 40 switched to the operation position is set so as to wait at a little above the seal ring 19 at a rotary side. Here a surface adjusting means "m" is comprised of the annular frame 39, the positioning ring 37, and the level board 40 and a position means "S" for testing the tone wheel 21 is comprised of thus constructed surface adjusting means "m" and the chucking jaws 36a.

As shown in FIG. 6, the reference level board 40 is quietly moved down to forcibly go down the rotary side seal ring 19 together with the positioning ring 37 so as to oppose the upward energizing force of the compression spring 29. The downward movement of the reference level board 40 executes a positioning procedure which is continued until it contacts the upper end of the annular frame 39 to be stopped. Precisely the reference level board is moved down until the compression springs 29 supporting the positioning ring are compressed enough to resiliently press the rotary side seal ring 19 by contacting with the reference level board. Consequently the annular frame roles a stopper for the reference level board. And when the level board 40 is stopped by contacting the annular frame 39, there is a little vertical gap between the upper surface of the chucking jaws 36a and the bottom surface 40a of the reference level board 40 and further the rotary side seal ring 19 is pressed with a certain force onto the precise flat bottom surface 40a of the reference level board 40 by the upward energized force of the plural compression springs 29. Therefore, the tone wheel 21 is aligned in the rotary axis with the level board 40 so that the surface is corrected in the horizontal position and kept to be a preferable level surface without having ups and downs or irregularities in the circumferential direction.

Then, while keeping the level board 40 at the lowest position, plural chucking jaws 36a are moved out to execute a fixing procedure which presses the rotary tubular part 20a into a direction to be expanded so as to make the center of the rotary side sealing ring 19 align with the rotary axis of the rotatable chucking mechanism 27. Thus, the rotary side seal ring 19 is fixed by chucking with the chucking jaws 36a while keeping the tone wheel 21 corrected in a level surface.

When the rotary side seal ring 19 is thus fixed with the chucking jaws 36a, the reference level board 40 is moved into a non-operation position as shown in FIG. 7, the magnetic testing sensor 28 which is drawn in the non-operation position is alternatively switched to be the operation position, and a test preparation procedure is executed such that the sensor 28 is positioned directly above the tone wheel 21 with an appropriate gap in vertical direction. When the reference level board 40 is removed, the rotary side seal ring 19 is kept to be level by means of the chucking jaws 36a.

Then, the rotary axis 33 and the rotatable chucking mechanism 27 are rotated by the motor 34, and a test procedure is executed such that the array pitch of both poles and the intensity of magnetic field of the tone wheel 21 are measured and tested from the detection information outputted from the magnetic testing sensor 28. Namely, in the test procedure, the detection information by the standard encoder 25 and the detection information by the magnetic testing sensor 28 are compared so that the control means 11 determines the tone wheel 21 is good or inferior. According to this test apparatus A, the encoder 10 for detecting rotation speed is comprised of the tone wheel 21 rotating while being fixed with the chucking jaws 36a and the magnetic testing sensor 28 provided close to the tone wheel 21.

<Other Embodiment 1>

Figure 8:
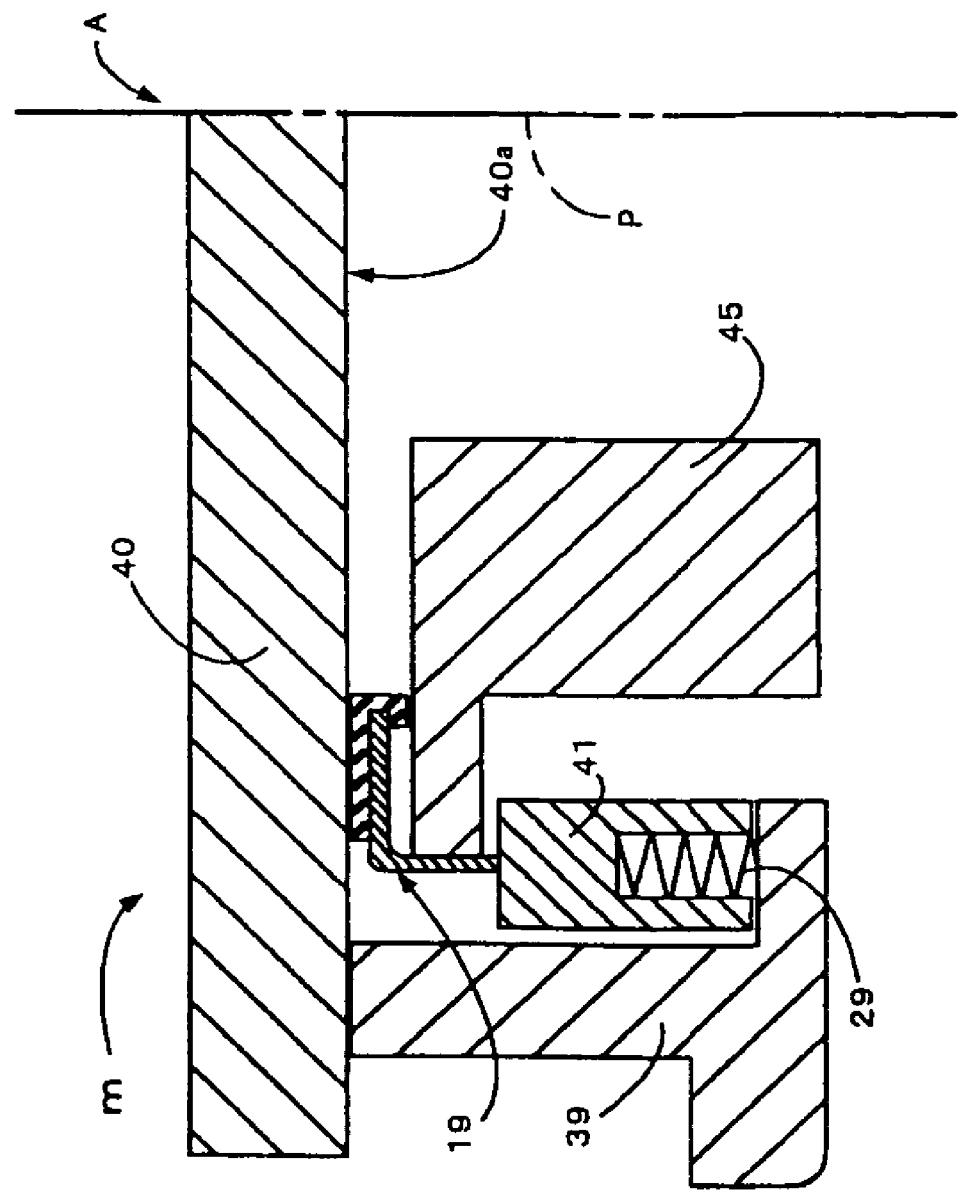
FIG. 8 is an explanatory operation view showing a test method of another seal ring at a rotary side.

As shown in FIG. 8, the tone wheel testing apparatus A may be constructed so as to be adapted with a seal ring 19 at a rotary side (see FIG. 9) which is different from the rotary side seal ring 19 as shown in FIG. 2. The difference with the test apparatus A shown in FIG. 4–FIG. 7 is a positioning ring 41 with a reduced height and chucking jaws 45 having a flange part 42 with a reduced height are provided, other constructions are the same.

Figure 9A:
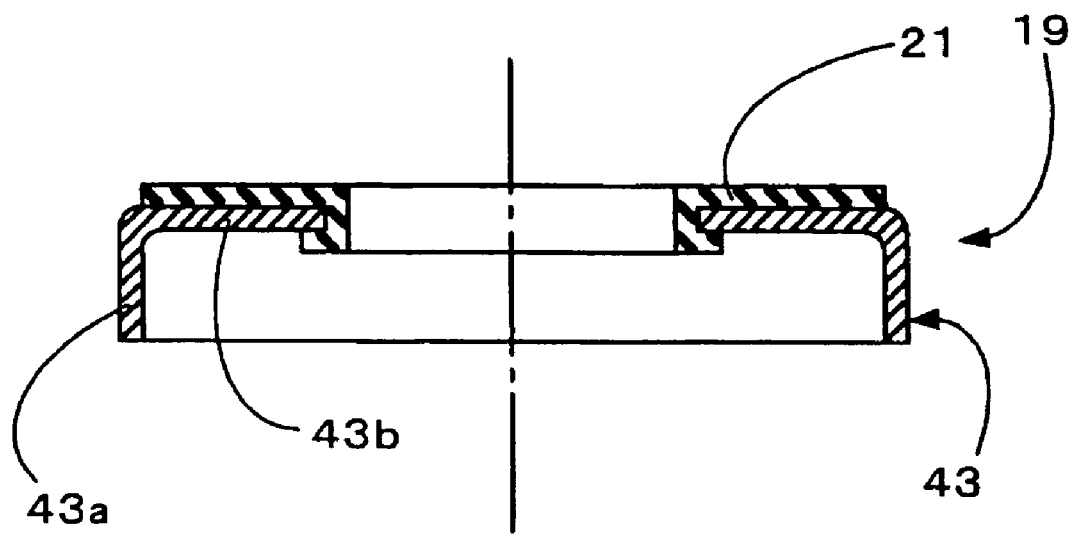
FIG. 9a and FIG. 9b are a sectional views showing another seal ring at a rotary side.

In contrast to the construction in FIG. 2, the rotary side seal ring 19 in FIG. 9 is functioned as a seal ring at a rotary side when the outer ring 13 is provided for the rotary side member and the inner ring 14 is provided for the fixed side member. FIG. 9a shows the rotary side seal ring 19 comprised of a tubular core member (slinger) 43 which is L-shaped in its section and a tone wheel 21 attached to the surface of a wall part 43b, the core member 43 being comprised of a fit tubular part 43a to be fitted in the outer ring and the wall part 43b bent from the end of the tubular part 43a into the inner diameter.

Figure 9B:
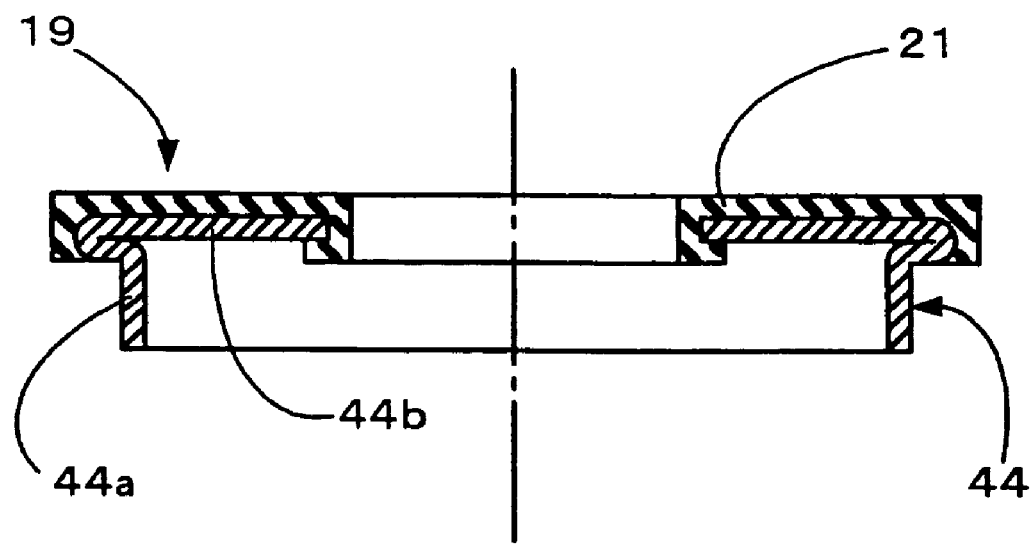

FIG. 9b shows a rotary side seal ring 19 comprised of a tubular core member (slinger) 44 which has a fit tubular part 44a to be internally fitted in the outer ring and a wall part 44b of which maximum diameter is enlarged by protruding from the outer ring and of a tone wheel 21 attached to the side surface of the wall part 44b. The core members 43 and 44 shown in FIG. 9a and FIG. 9b may be used as a support member exclusively supporting the tone wheel 21 to the rotary side member.

FIG. 8 shows an embodiment wherein the rotary side seal ring 19 shown in FIG. 9a is used and corresponds to the embodiment shown in FIG. 6 of the present invention. Namely, the positioning ring 41 and the reference level board 40 are contacted with pressure in a vertical direction, the chucking jaws 45 is moved out so as to make the fit tubular part 43a fix the core member 43 by chucking, then test is executed. With the rotary side seal ring 19 in FIG. 9b, test in the same manner can be executed.

<Other Embodiment 2>

The chucking jaws 36 may be constructed such that it holds the rotary side seal ring 19 from its outer diameter and the outer frame 39 slidably fitting and supporting the positioning ring 37 is positioned in an inner diameter side of the positioning ring 37. The entire test apparatus A shown in FIG. 4 may be rotated at 90 degrees to be toppled. The object to be tested may be a brake disc or an specific steel plate ring provided with a tone wheel or may be only the tone wheel 21. It may not be limited to a seal ring. The standard encoder may be any one except for an optical type and may be positioned so as to measure the rotation speed of outer frame 39 or tone wheel 21.

As mentioned above, according to the tone wheel testing apparatus and the test method of the present invention, the inner seal ring is placed on the upper surface of the positioning ring internally fitted in the outer frame so as to be slidable up and down, the reference level board with a reference surface made of a flat bottom surface goes down so as to be contact with the upper end of the outer frame, thereby holding the inner seal ring being pressed vertically with thus descended level board and the positioning ring energized upwardly by the compression spring, forcibly aligning the tone wheel with a level surface, and fixing the inner seal ring with the chuck.

Accordingly, the gap between the tone wheel incorporated into the seal ring of the bearing and the test sensor opposing the tone wheel in close vicinity is accurately kept constant, both of which constituting the encoder for detecting the rotation speed. The ups and downs of the tone wheel surface in the circumferential direction and an appropriate gap between the test sensor accompanied with rotation are accurately set, thereby enabling a preliminary arrangement for executing accurate measurement of the array pitch of both poles and the intensity of the magnetic field. As the result, if the seal ring has relatively week rigidity, it can be detected in the same condition that it is incorporated into the bearing. Therefore, there are provided the tone wheel testing apparatus and the test method in which accurate and preferable magnetic measurement is executed advantageously as an actually loaded tone wheel.

The invention claimed is:

1. Tone wheel testing apparatus comprising:
   a surface adjusting means for holding in the horizontal position an annular object to which a tone wheel is attached, said surface adjusting means comprising a pair of pressing members between which said annular object is held, and the one of said pressing member having a reference surface with which said tone wheel is contacted in order to align said tone wheel in the rotary axis direction of said annular object;
   a rotatable chucking means for seizing said annular object so as to align the center of said annular object with its rotary center when said annular object is held by said surface adjusting means; and
   a magnetic testing sensor disposed adjacent to said tone wheel of said annular object so as to face each other.

2. The tone wheel testing apparatus as set forth in claim 1,
   wherein said surface adjusting means comprises a positioning ring and a reference level board as said pair of presser members, between which said annular object is held in said horizontal position in a manner that said reference level board contacts said tone wheel set on said positioning ring from above,
   wherein said rotatable chucking means comprises an annular frame and chucking jaws capable of moving in and out in its base body, and
   wherein said positioning ring is disposed in said annular frame in a manner that said positioning ring is movable up and down supported by a resilient member so as to allow movement toward said reference level board.

3. The tone wheel testing apparatus as set forth in claim 1 or 2, further comprising:
   a reference encoder detecting a rotation number per a unit time of said tone wheel attached to of said annular object, said annular object being rotated accompanying said chucking means rotating,
   a processing means for determining whether said tone wheel is good or bad by comparing the information obtained from said reference encoder with the information obtained from said magnetic testing sensor.

4. Test method of a tone wheel attached to an object, using a tone wheel testing apparatus, comprising the steps of:
   providing a tone wheel testing apparatus which comprises a surface adjusting means for holding in the horizontal position an annular object to which a tone wheel is attached, said surface adjusting means comprising a pair of pressing members between which said annular object is held, the one of said pressing member having a reference surface with which said tone wheel is contacted in order to align said tone wheel in the rotary axis direction of said annular object,
   providing a rotatable chucking means for seizing said annular object so as to align the center of said annular object with its rotary center when said annular object is held by said surface adjusting means, and
   a magnetic testing sensor disposed adjacent to said tone wheel of said annular object so as to face each other, holding said annular object horizontally by said surface adjusting means, in a manner that said reference surface contacts with said tone wheel set on said positioning ring so as to align said tone wheel in the rotary axis direction of said annular object, seizing said annular object by said rotatable chucking means when said annular object is held by said surface adjusting means so as to align the center of said annular object with that of said chucking means, and rotating said rotatable chucking means and measuring the signal detected by operation of said magnetic testing sensor.

5. The test method of a tone wheel attached to said object, as set forth in claim 4, wherein said pair of pressing members comprise a positioning ring and a reference level board, and said rotatable chucking means comprises an annular frame and chucking jaws capable of moving in and out in its base body, said positioning ring being movable up and down supported by a resilient member so as to allow the moving toward said reference level board, and wherein the step of holding said object is performed by executing the following steps;

setting said annular object on said positioning ring; and moving said reference level board down until said resilient member is compressed enough to resiliently press said annular object by contacting with said reference level board.

6. The test method of a tone wheel attached to an object, as set forth in claim 5, wherein said annular frame functions as a topper when said reference level board is moved down toward said tone wheel of said annular object.

7. The tone wheel testing apparatus as set forth in claim 1, 2 or 3, wherein said annular object is a slinger or seal ring.

8. The test method of tone wheel attached to said object using said tone wheel testing apparatus as set forth in claim 4, 5 or 6, wherein said annular object is a slinger or seal ring.

* * * * *